(12) United States Patent
Lu

(10) Patent No.: US 6,995,752 B2
(45) Date of Patent: Feb. 7, 2006

(54) MULTI-POINT TOUCH PAD

(75) Inventor: Jin Lu, Croton on Hudson, NY (US)

(73) Assignee: Koninklijke Philips Electronics N.V., Eindhoven (NL)

(*) Notice: Subject to any disclaimer, the term of this patent is extended or adjusted under 35 U.S.C. 154(b) by 286 days.

(21) Appl. No.: 10/008,216

(22) Filed: Nov. 8, 2001

(65) Prior Publication Data

US 2003/0085882 A1    May 8, 2003

(51) Int. Cl.
  *G09G 5/00* (2006.01)
(52) U.S. Cl. .................... 345/174; 345/173; 341/34
(58) Field of Classification Search ........ 345/156–157, 345/168–169, 173–179; 178/18.01–18.07, 178/19.01–19.05, 20.01; 341/20, 22, 33, 341/34
  See application file for complete search history.

(56) References Cited

U.S. PATENT DOCUMENTS

| | | | |
|---|---|---|---|
| 5,159,159 A | 10/1992 | Asher | 178/18 |
| 5,488,204 A | 1/1996 | Mead et al. | 178/18 |
| 5,825,352 A * | 10/1998 | Bisset et al. | 345/173 |
| 5,880,411 A * | 3/1999 | Gillespie et al. | 178/18.01 |
| 5,943,043 A * | 8/1999 | Furuhata et al. | 345/173 |
| 6,037,882 A * | 3/2000 | Levy | 341/20 |
| 6,255,604 B1 * | 7/2001 | Tokioka et al. | 178/18.01 |
| 6,292,173 B1 * | 9/2001 | Rambaldi et al. | 345/157 |

FOREIGN PATENT DOCUMENTS

WO    9718547 A1    5/1997

* cited by examiner

Primary Examiner—Ricardo Osorio

(57) ABSTRACT

A multi-point touch pad device having a base with a top surface that defines a plane. A support layer has a top surface and a bottom surface. The top surface of the support layer contains a plurality of strain gauges that are disposed on the top surface of the support layer in a matrix configuration. A touch layer is disposed on top of the strain gauge matrix; the touch layer is joined to the top of the strain gauge matrix. Sensor wires connect the strain gauges to a processor which is programmed with an algorithm to measure the location and pressure of simultaneous, multiple touches.

21 Claims, 3 Drawing Sheets

MULTI-POINT TOUCH PAD

BACKGROUND OF THE INVENTION

The invention relates generally to touch pads and more particularly to a multi-point touch pad data input device.

Presently, touch pads are used in a variety of applications and in various devices. They are used on computers to control the pointing device as well as videogame controllers and security system keypads, to name a few. Conventional touch pads are generally only capable of registering one touch at a time, and generally, are incapable of registering a touch unless the touch is in a specific location on the touch pad. Generally, touch pads used with computer equipment will register an initial location where the finger touches the pad, and subsequent finger movement will be related to that initial point. Furthermore, certain computer touch pads generally may contain two special places where applied pressure corresponds to clicking a left or right mouse button. Other computer touch pads sense single taps or double taps of the finger at any point on the touch pad as corresponding to clicking a left or right mouse button. Thus, the single point touch pad is mainly used as a pointing device with a computer or with a device that only registers one specifically located touch such as a keypad.

New technologies including video game systems, computers, as well as devices incorporating electronic music require the need for multi-point touch pad technology. A multi-point touch pad can detect multiple touch points simultaneously on a single touch pad. Currently, multi-point touch pad technologies include the use of fiber-optic based pressure sensing, Force Sensing Resistors™ (FSR), piezoelectric sensors and capacitive touch sensors. The aforementioned technologies allow touch pads to register multiple touches. However, specifically in the case of force sensing resistors, piezoelectric sensors and capacitive touch sensors, a touch on the touch pad will not be detected unless the sensor on the touch pad is touched directly. Consequently, if the space between sensors is touched, a touch will not be properly detected or registered.

Another desirous feature of multi-point touch pads is the ability to measure pressure as well as multiple point touches. FSRs, piezoelectric sensors and capacitive touch sensors are other types of sensors that can respond to pressure. However, they suffer the same problem as previously mentioned in measuring pressure, namely, if not touched directly, there is little response, an inaccurate response or no response from the sensors.

Thus, the aforementioned touch pads are of limited use to a user seeking to control various types of devices with precision and accuracy. Accordingly, there is a need for a multi-point touch pad that ensures that simultaneous, multiple touches may be accurately and precisely sensed and recorded. There is also a desire that multi-point touch pads can accurately and precisely sense and record the pressure that is placed by the touch.

SUMMARY OF THE INVENTION

The present invention is directed to a multi-point touch pad device using strain gauges or comparable measurement devices for measuring location and touch pressure that ensure an accurate and precise touch on the touch pad. A multi-point touch pad device in accordance with a preferred embodiment of the invention can be made capable of sensing simultaneous, multiple touches as well as accurately and precisely recording the amount of pressure registered by each touch. Various output signals from the touch pad can be compiled and calculated into a set of locations and pressures associated with touch points with the assistance of a specifically written and designed mathematical algorithm which can be programmed into a Digital Signal Processor (DSP).

A touch pad in accordance with a preferred embodiment of the invention can include a touch surface. A plurality of pressure sensors such as strain gauges are arranged under and coupled to the touch surface. As a user touches the surface at multiple points, the pressure sensors send pressure reading signals to a processor which uses those readings to calculate touch locations and preferably also touch pressure. The processor can then send control signals to control the operation of a device.

Other objects and features of the present invention will become apparent from the following detailed description, considered in conjunction with the accompanying drawing figures. It is to be understood, however, that the drawings are designed solely for the purpose of illustration and not as a definition of the limits of the invention.

BRIEF DESCRIPTION OF THE DRAWINGS

In the drawing figures, which are merely illustrative, and wherein like reference numerals depict like elements throughout the several views.

DETAILED DESCRIPTION OF THE PREFERRED EMBODIMENTS

The present invention is directed to a multi-point touch pad device having a touch surface with a top surface that defines a plane, and also having a base with a surface defining a plane. At least one wall extends generally perpendicular to and away from the plane at the edge of the base. The base and at least one wall form a touch pad enclosure. A support layer made of a soft, resilient material is preferably disposed under the touch surface. The top of the support layer contains a plurality of pressure reading devices such as strain gauges that can be adhesively bonded or otherwise coupled to the top surface of the support layer, preferably in a matrix configuration. A touch layer which can be formed of a thin, film-like material is preferably disposed on top of the strain gauge matrix. The touch layer is preferably adhesively bonded or otherwise joined to the top of the strain gauge matrix. The strain gauge matrix can therefore be disposed between the support layer and the touch layer.

Each strain gauge sensor can be provided with a pair of sensor wires for measuring changes in resistance from the strain gauge sensor resulting from a single touch and pressure or a plurality of touches and pressures at locations across the pad. The pair of sensor wires from each strain gauge of the strain gauge matrix are preferably connected through a single signal cable to a Digital Signal Processor (DSP). The DSP is preferably constructed to measure the current (and/or voltage) change across each strain gauge sensor as a measure of strain and uses this information relating to strain to calculate the exact positions and the relative pressures of the touch points based on a preprogrammed mathematical algorithm contained in the DSP. The calculated results from the DSP algorithm can be sent to an application board, where the locations of the touch points, and/or the sensed pressure, are used by the desired applications.

Figure 1:
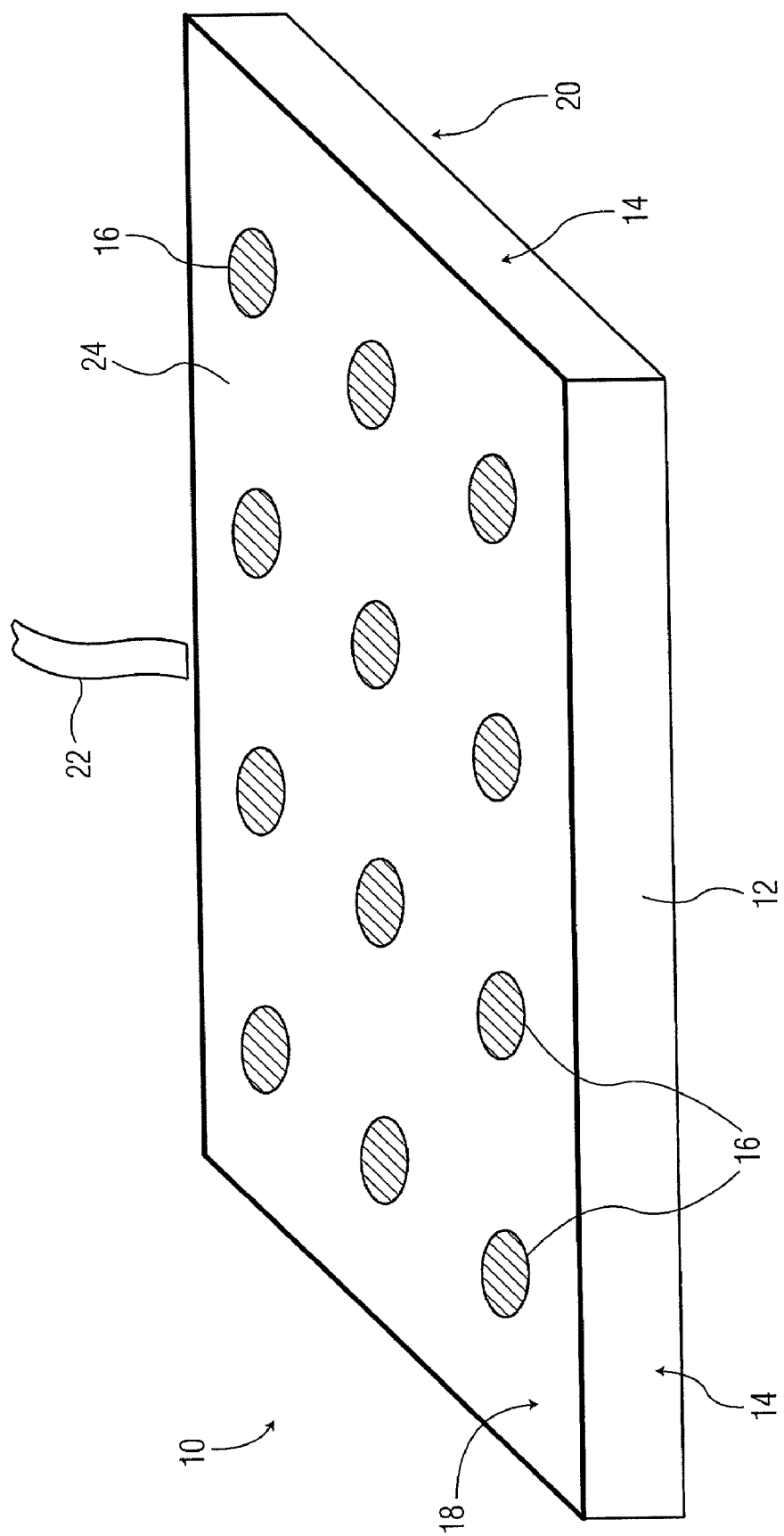
FIG. 1 is a perspective top-view of the multi-point touch pad in accordance with a preferred embodiment of the invention.
Figure 2:
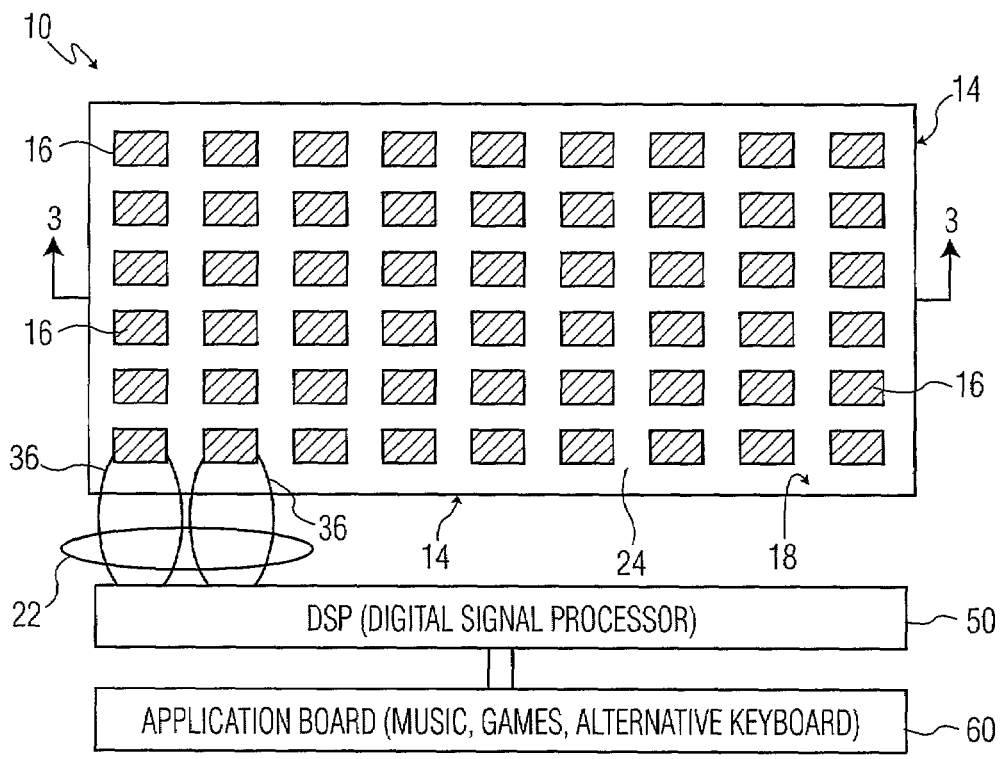
FIG. 2 is a top-plan view of the multi-point touch pad of FIG. 1.
Figure 3:
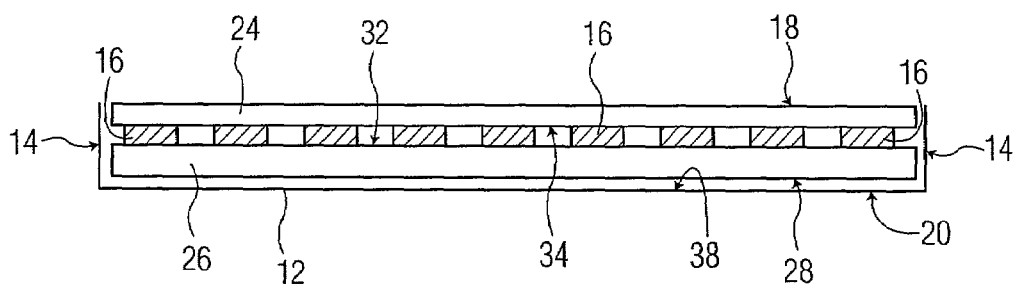
FIG. 3 is a cross-section view taken along line 3—3 of the multi-point touch pad of FIG. 2.

Referring now to the drawings in detail, the various embodiments of the present invention will now be discussed. With reference first to FIGS. 1–3, a multi-point touch pad device constructed in accordance with an embodiment of the present invention is depicted and generally designated by reference numeral 10. Multi-point touch pad 10 is preferably unitarily formed and includes a base 20 having a top surface 38 that defines a plane. A wall 14 extends generally perpendicular to and away from the plane of top surface 38 at an edge of base 20. Base 20 combined with at least one wall 14 serves to form a touch pad enclosure 12.

Referring now to FIG. 3, with continued reference to FIGS. 1 and 2, a support layer 26 having a top surface 32 and a bottom surface 28 may be approximately the same size and shape as the touch pad enclosure 12. Support layer 26, which can be formed of a soft foam-like material having shock absorbency properties, is disposed within touch pad enclosure 12. In a preferred embodiment of the invention, the support layer bottom surface 28 is seated adjacent and parallel to top surface 38. A plurality of sensors, preferably strain gauges 16, are placed adjacent to the support layer top surface 32, preferably in a matrix configuration.

Various types of sensors known to those skilled in the art such as, for example, Force Sensing Resistors™ (FSRs), piezoelectric sensors and capacitive touch sensors may be used in the present invention. However, strain gauges 16 can offer more precise response properties and can be more cost effective as compared to the other sensors known by those skilled in the art. Strain gauges 16 are the preferred sensors for use in the present invention.

With continued reference to FIG. 3, as well as with continued reference to FIGS. 1 and 2, a touch layer 24 is disposed on strain gauges 16 and is adhesively bonded thereto with strain gauges 16 forming a matrix configuration to effectuate an acceptable degree of coverage and responsiveness for multi-point touch pad 10. In practice, strain gauges 16 will sense a deformity of the strain gauge 16 and touch layer 24 combination which will cause a proportional change in the strain gauge 16 resistance. With a voltage placed on the strain gauge 16, the deformation and hence, the change in resistance, will result in a change in current flowing through (or voltage across) the strain gauge 16; a change in current (or voltage) which is measurable.

As illustrated in FIGS. 1–3, touch layer 24 having a touch layer top surface 18 and a touch layer bottom surface 34, touch layer 24 being advantageously formed of an elastic material such as spring steel or bronze and touch layer 24 further having properties to insulate strain gauges 16 from moisture and dust infiltration while also being sensitive and precise to the touch. Disposed adjacent to strain gauges 16 is support layer 26 which keeps strain gauges 16 flat when no pressure is exerted on them, thereby preventing erroneous readings from multi-point touchpad 10.

With reference now to FIG. 2, strain gauges 16 each contain a pair of sensor wires 36. Sensor wires 36 are further connected to a digital signal processor (DSP) 50. The sensor wires 36 are encapsulated within signal cable 22, signal cable 22 being connected to touch pad enclosure 12 and to DSP 50. The DSP 50, processes signals received from strain gauges 16 through sensor wires 36 with the assistance of an algorithm (e.g. software programmed) contained within DSP 50.

Figure 4:
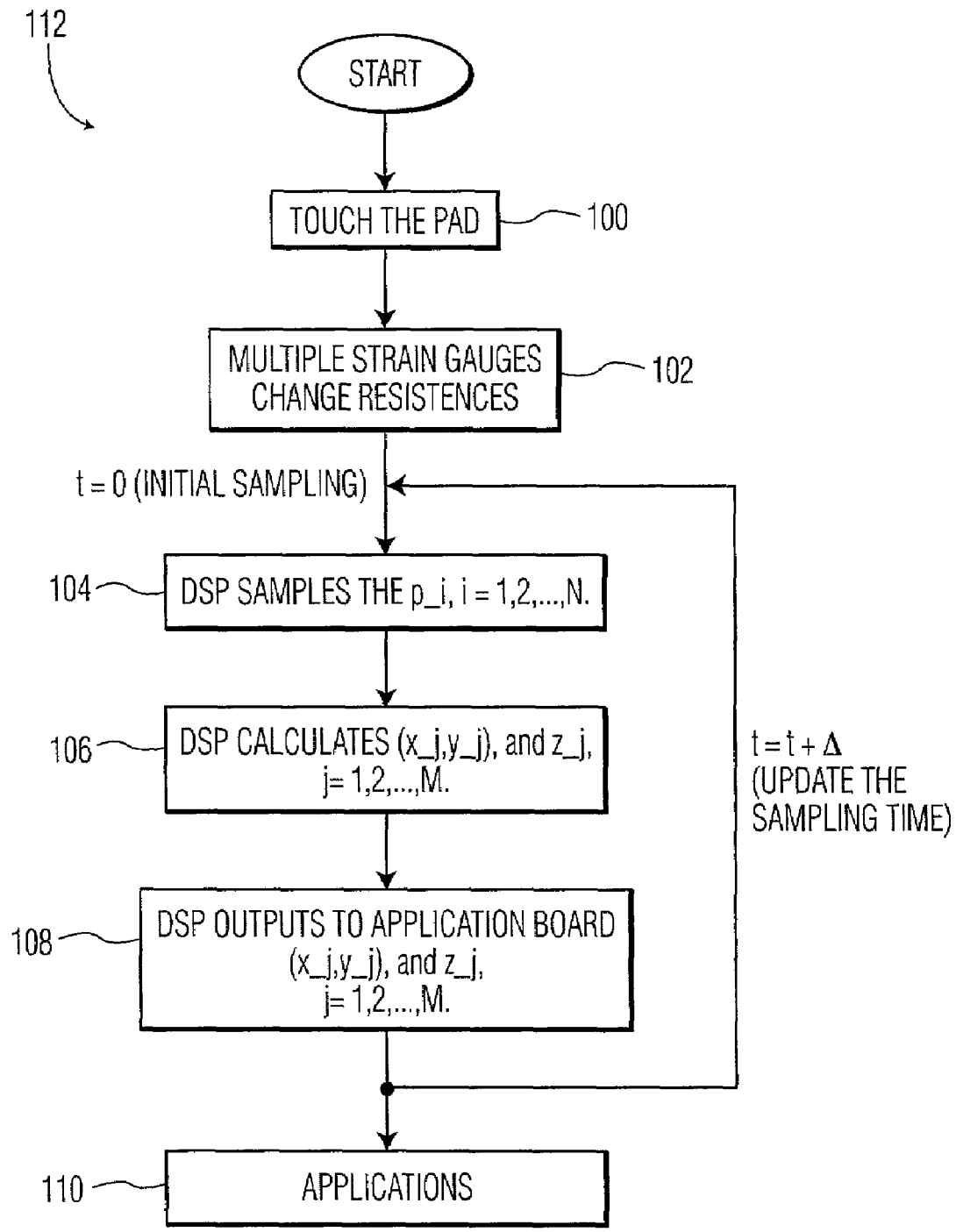
FIG. 4 is a flow diagram of an exemplary process of content augmentation in accordance with a preferred embodiment of the present invention.

With reference now to FIG. 4, and continued reference to FIG. 2, DSP 50 is constructed to implement the algorithm represented by the flowchart depicted in FIG. 4. The software that controls the algorithm of DSP 50 may be programmed by different programmers in various forms or programming languages. However, the functionality should remain consistent with the mathematical formulas for the multi-point touch pad 10 to function according to its design.

A flow chart 112 illustrated in FIG. 4 depicts the operation and performance of multi-point touch pad 10 having the DSP 50 which contains a software programmed algorithm therein. Flow Chart 112 contains a touch module 100 which illustrates a user touching the touch pad with a single position and pressure or with simultaneous positions and pressures. With reference to sensing module 102 the touch by the user causes a change in the resistances of one or more of strain gauges 16. The resistance changes are registered on strain gauges 16 which are then transmitted through sensor wires 36 to DSP 50. DSP 50 then samples the signal as illustrated in DSP sampling module 104.

DSP 50 is programmed with a software algorithm which contains the known positions of strain gauges 16 on multi-point touch pad 10. These positions are identified with the following formula: $(a\_i, b\_i)$, $i=1, 2, \ldots, N$, where N is the number of strain gauges 16, and the measured pressures of strain gauges 16 are $p\_i$, $i=1, 2, \ldots, N$. For purposes of illustration, assume the positions of the touch points on multi-point touch pad 10 are: $(x\_j, y\_j)$, $j=1, 2, \ldots, M$, where M is a known number of the touch points (less than N), but $x\_j$ and $y\_j$ are unknown and will be determined by the calculations of the formula. In addition, assume that the pressures of the touch points are: $z\_j$, $j=1, 2, \ldots, M$, which are also to be calculated using the software algorithm.

The software algorithm programmed in DSP 50 then transfers the sampling data from DSP sampling module 104 to DSP calculation module 106 where the software algorithm calculates the position and pressure of the touch points using the following mathematical formula: $p\_i = w(|(x\_1, y\_1)-(a\_i, b\_i)|)z\_1 + w(|(x\_2, y\_2)-(a\_i, b\_i)|)z\_2 + \ldots + w(|(x\_M, y\_M)-(a\_i, b\_i)|)z\_M$, $i=1, \ldots, N$; where $w(|(x\_i, y\_j)-(a\_i, b\_i)|)$ is a weighting factor that reflects the effect of pressure $z\_j$ on $p\_i$. The software algorithm of DSP 50 further calculates that: $w(|(x\_i, y\_j)-(a\_i, b\_i)|)$ is a function of the distance between the touch point $(x\_j, y\_j)$ and the sensor location $(a\_i, b\_i)$. The software algorithm further calculates that $|(x\_j, y\_j)-(a\_i, b\_i)| = \text{sqrt}((x\_j-a\_i)*(x\_j-a\_i)-(y\_-b\_i)*(y\_j-b\_i))$ as being the distance between the touch point of j and the sensor i. The notation "sqrt" is representative of square root.

Further referring to FIG. 4 and the equation contained within the software algorithm of DSP 50, the equation calculates that the pressure measured at strain gauge 16, and "i" is a summation of the pressure components caused by multiple touch points. Each pressure component is a function of the pressure of the corresponding touch point, the distance between the touch point and the location of the sensor. The farther the distance between a touch point and an individual strain gauge 16, the less effect the touch point has on the strain gauge 16. By solving the equation for the unknown values, the locations and the pressures of the multiple touch points will be determined. The results of the calculations performed in DSP calculation module 106 are then outputted via a DSP output module 108 to an application as illustrated in an application module 110.

Referring back to FIG. 2, a multi-point touch pad 10 contains strain gauges 16 which are connected to DSP 50 through sensor wires 36. DSP 50 is further connected to application board 60 which would control the applications utilizing the output signals from DSP 50. Applications controlled by application board 60 may include computer equipment, videogame controllers, music devices, alternative keyboards and the like.

While the invention has been described in connection with preferred embodiments, it will be understood that modifications thereof within the principles outlined above will be evident to those skilled in the art and thus, the invention is not limited to the preferred embodiments but is intended to encompass such modifications.

What is claimed is:

1. A multi-point touch pad, comprising:
   a touch layer having a top surface and a bottom surface;
   a plurality of pressure sensing devices coupled to the bottom surface of the touch layer such that touch pressure applied to the top surface will impart pressure to the pressure sensing devices near the location of the touch pressure; and
   at least one processor coupled to the pressure sensing devices and constructed to calculate locations of at least two points on the top surface being simultaneously touched based on pressure sensing readings from the pressure sensing devices, wherein
      each pressure sensing device emits a signal representative of an amount of pressure at that devices; and
      the locations of the at least two points are derived simultaneously using geometrically based calculations departing from differences in the amount of pressure detected at distinct ones of the pressure sensors.

2. The touch pad of claim 1, wherein the processor is also constructed to calculate the pressure applied at each point being touched.

3. The touch pad of claim 1, wherein the pressure sensing device comprises a sensor selected from the group consisting of force sensing resistors, piezoelectric sensors and capacitive touch sensors.

4. The touch pad of claim 1, wherein each of the pressure sensing device comprises a strain gauge.

5. The touch pad of claim 4, wherein the pressure sensing devices are arranged in a matrix.

6. The touch pad of claim 1, wherein the processor is a digital signal processor (DSP).

7. The touch pad of claim 1, wherein the pressure sensing devices are arranged in a matrix.

8. The touch pad of claim 1, wherein the processor is constructed to perform the following algorithm:
   a. sampling the pressure sensing reading from the plurality of pressure sensing devices;
   b. calculating locations of one or more touches on the touch pad;
   c. calculating the amount of pressure exerted on each touch on the touch pad; and
   d. outputting calculation data.

9. A device comprising the pad of claim 1, further comprising a processor for interpreting the simultaneous touches as musical.

10. A multi-point touch pad, comprising:
    a touch layer having a top surface and a bottom surface;
    a plurality of pressure sensing devices coupled to the bottom surface of the touch layer such that touch pressure applied to the top surface will impart pressure to the pressure sensing devices near the location of the touch pressure; and
    at least one processor coupled to the pressure sensing devices and constructed to calculate locations of at least two points on the top surface being simultaneously touched based on pressure sensing readings from the pressure sensing devices,
    wherein the processor is constructed to perform the following algorithm:
       a. sampling the pressure sensing reading from the plurality of pressure sensing devices;
       b. calculating locations of one or more touches on the touch pad;
       c. calculating the amount of pressure exerted on each touch on the touch pad; and
       d. outputting calculation data; and
    wherein:
       the algorithm contains known positions of the pressure sensing devices on the multi-point touch pad;
       the known positions of the pressure sensing devices are identified with the following formula: $(a\_i, b\_i)$, $i=1, 2, \ldots, N$, where N is a number of pressure sensing devices, and the measured pressures of the pressure sensing devices are $p\_i$, $i=1, 2, \ldots, N$;
       the positions of the touch points on multi-point touch pad are identified with the following formula: $(x\_j, y\_j)$, $j=1, 2, \ldots, M$, where M is a known number of the touch points that is less than N, but $x\_j$ and $y\_j$ are unknown and will be determined by the calculations of the formula;
       the pressures of the touch points are identified with the formula: $z\_j$, $j=1, 2, \ldots, M$, which are also to be calculated using the algorithm;
       the algorithm transfers the sampling data from a DSP sampling module to a processor calculation module where the algorithm calculates the position and pressure of the touch points using the following formula: $p\_i = w(|(x\_1, y\_1)-(a\_i, b\_i)|)z\_1 + w(|(x\_2, y\_2)-(a\_i, b\_i)|)z\_2 + \ldots + w(|(x\_M, y\_M)-(a\_i, b\_i)|)z\_M$, $i=1, \ldots, N$; where $w(|(x\_j, y\_j)-(a\_i, b\_i)|)$ is a weighting factor that reflects the effect of pressure $z\_j$ on $p\_i$;
       the algorithm calculates that: $w(|(x\_i, y\_j)-(a\_i, b\_i)|)$ is a function of the distance between the touch point $(x\_j, y\_j)$ and the sensor location $(a\_i, b\_i)$;
       the algorithm calculates that $|(x\_j, y\_j)-(a\_i, b\_i)|=\text{sqrt}((x\_j-a\_i)*(x\_j-a\_i)-(y\_j-b\_i)*(y\_j-b\_i))$ as being the distance between the touch point of j and the sensor i using the notation "sqrt" as being representative of square root.

11. A method of controlling an application with a touch pad, comprising the steps of:
    providing a touch pad having a touch surface with a bottom and a top and a plurality of pressure sensors arranged under the touch surface and coupled to the bottom of the touch surface;
    sending a signal to a processor corresponding to a pressure at each sensor when the top of the touch surface is simultaneously touched at two or more points; and
    performing an algorithm to determine the location of the two or more touch points based on comparing the pressure at each of the sensors.
    wherein
       each pressure sensing device emits a signal representative of an amount of pressure at that devices; and the locations of the at least two points are derived simultaneously using geometrically based calculations departing from differences in the amount of pressure detected at distinct ones of the pressure sensors.

12. The method of claim 11, further comprising the step of:
calculating the pressure applied at each point being touched.

13. The method of claim 11, wherein the pressure sensors are selected from the group consisting of force sensing resistors, piezoelectric sensors and capacitive touch sensors.

14. The method of claim 11, wherein the pressure sensors comprise strain gauges.

15. A method of claim 14, wherein the sensors are arranged in a matrix.

16. The method of claim 11, wherein the processor is a digital signal processor (DSP).

17. The method of claim 11, wherein the pressure sensors are arranged in a matrix configuration.

18. The method of claim 11 wherein the algorithm comprises the steps of:
a. sampling the signals from the plurality of pressure sensors;
b. calculating locations of one or more touches on the touch pad;
c. calculating the amount of pressure exerted on each touch on the touch pad; and
d. outputting calculation data from the algorithm to control the application.

19. A method of controlling an application with a touch pad, comprising the steps of:
providing a touch pad having a touch surface with a bottom and a top and a plurality of pressure sensors arranged under the touch surface and coupled to the bottom of the touch surface;
sending a signal to a processor corresponding to a pressure at each sensor when the top of the touch surface is simultaneously touched at two or more touch points; and
performing an algorithm to determine locations of the two or more touch points based on comparing the pressure at each of the sensors
comprising the steps of:
identifying positions of pressure sensors with the formula: $(a\_i, b\_i)$, $i=1, 2, \ldots, N$, where N is the number of pressure sensors, and the measured pressures of pressure sensors are $p\_i$, $i=1, 2, \ldots, N$;
programming the positions of the touch points on the multi-point touch pad as $(x\_j, y\_j)$, $j=1, 2, \ldots, M$, where M is a known number of the touch points that is less than N, and $x\_j$ and $y\_j$ are unknown and will be determined by the calculations of the algorithm;
quantifying the pressures of the touch points with the formula $z\_j$, $j=1, 2, \ldots, M$, using the algorithm;
transferring sampling data from a sampling module to a calculation module;
calculating the positions and pressures of the touch points using the following formula: $p\_i = w(|(x\_1, y\_1)-(a\_i, b\_i)|)z\_1 + w(|(x\_2, y\_2)-(a\_i, b\_i)|)z\_2 + \ldots + w(|(x\_M, y\_M)-(a\_i, b\_i)|)z\_M$, $i=1, \ldots, N$; where $w(|(x\_j, y\_j)-(a\_i, b\_i)|)$ is a weighting factor that reflects the effect of pressure $z\_j$ on $p\_j$ using the algorithm;
calculating that: $w(|(x\_j, y\_j)-(a\_i, b\_i)|)$ is a function of the distance between the touch point $(x\_j, y\_j)$ and the sensor location $(a\_i, b\_i)$ using the algorithm;
calculating that $|(x\_j, y\_j)-(a\_i, b\_i)| = \mathrm{sqrt}((x\_j-a\_i)*(x\_j-a\_i)-(y\_j-b\_i)*(y\_j-b\_i))$ as being the distance between the touch point of j and the sensor i using the notation "sqrt" as representing square root using the algorithm.

20. A method, comprising:
receiving a plurality of signals from a plurality of pressure sensors in a touch pad, the signals representing a plurality of pressures detected by the pressure sensors when the touch pad is simultaneously touched at two or more touch points;
identifying locations of the two or more touch points using the plurality of signals; and
identifying pressures applied to the two or more touch points using the plurality of signals,
wherein
each pressure sensor emits a signal representative of an amount of pressure at that sensors; and
the locations of the at least two points are derived simultaneously using geometrically based calculations departing from differences in the amount of pressure detected at distinct ones of the pressure sensors.

21. The method of claim 20, wherein:
the plurality of pressure sensors comprise a plurality of strain gauges;
each of the strain gauges comprises a pair or sensor wires; and
the pressure associated with at least one of the touch points causes a change in a resistance of at least one of the strain gauges, the change in resistance being transmitted through the pair of sensor wires of the at least one strain gauge.

* * * * *